United States Patent
Munsell et al.

(10) Patent No.: US 9,004,849 B2
(45) Date of Patent: Apr. 14, 2015

(54) GAS TURBINE ENGINE FORWARD BEARING COMPARTMENT ARCHITECTURE

(75) Inventors: Peter M. Munsell, Grandby, CT (US); Philip S. Stripinis, Rocky Hill, CT (US)

(73) Assignee: United Technologies Corporation, Hartford, CT (US)

(*) Notice: Subject to any disclaimer, the term of this patent is extended or adjusted under 35 U.S.C. 154(b) by 607 days.

(21) Appl. No.: 13/346,832

(22) Filed: Jan. 10, 2012

(65) Prior Publication Data
US 2013/0177385 A1    Jul. 11, 2013

(51) Int. Cl.
*F01D 25/16*    (2006.01)

(52) U.S. Cl.
CPC ...................................... *F01D 25/16* (2013.01)

(58) Field of Classification Search
CPC ........ F01D 5/084; F01D 25/125; F01D 25/16
USPC .......... 415/1, 111, 112, 114, 115, 116, 122.1, 415/142, 170.1, 175, 176, 179, 180, 229, 415/230
See application file for complete search history.

(56) References Cited

U.S. PATENT DOCUMENTS

| 3,382,670 | A | | 5/1968 | Venable |
| 3,844,110 | A | | 10/1974 | Widlansky et al. |
| 3,990,814 | A | | 11/1976 | Leone |
| 4,645,415 | A | * | 2/1987 | Hovan et al. ............... 415/115 |
| 5,080,555 | A | * | 1/1992 | Kempinger ................. 415/142 |
| 6,623,238 | B2 | * | 9/2003 | Langston et al. .......... 415/112 |
| 7,201,558 | B2 | * | 4/2007 | Norris et al. ............... 415/110 |
| 7,383,686 | B2 | * | 6/2008 | Aycock et al. ............... 60/782 |
| 2007/0084188 | A1 | | 4/2007 | Orlando et al. |
| 2007/0193276 | A1 | | 8/2007 | Corattiyil et al. |
| 2010/0160105 | A1 | | 6/2010 | Sheridan et al. |

OTHER PUBLICATIONS

International Search Report & Written Opinion for PCT/US2012/071827 dated Feb. 22, 2013.
International Preliminary Report on Patentability for International Application No. PCT/US20121071827 mailed on Jul. 24, 2014.

* cited by examiner

*Primary Examiner* — Igor Kershteyn
(74) *Attorney, Agent, or Firm* — Carlson, Gaskey & Olds P.C.

(57) ABSTRACT

A gas turbine engine includes a bearing structure mounted to the front center body case structure to rotationally support a shaft driven by a geared architecture. A bearing compartment passage structure is in communication with the bearing structure through a front center body case structure.

20 Claims, 4 Drawing Sheets

GAS TURBINE ENGINE FORWARD BEARING COMPARTMENT ARCHITECTURE

BACKGROUND

The present disclosure relates to a gas turbine engine, and in particular, to a case structure therefor.

Geared turbofan architectures may utilize epicyclic reduction gearboxes with planetary or star gear trains for their compact design and efficient high gear reduction capabilities. The geared turbofan architecture de-couples a fan rotor from a low spool through the reduction gearbox which results in isolation of the forwardmost bearing compartment.

SUMMARY

A gas turbine engine according to an exemplary aspect of the present disclosure includes a geared architecture at least partially supported by a front center body case structure. A bearing structure mounted to the front center body case structure to rotationally support a shaft driven by the geared architecture. A bearing compartment passage structure in communication with the bearing structure through the front center body case structure.

A method of communicating a buffer supply air for a gas turbine engine according to an exemplary aspect of the present disclosure includes communicating a buffer supply air across an annular core flow path.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
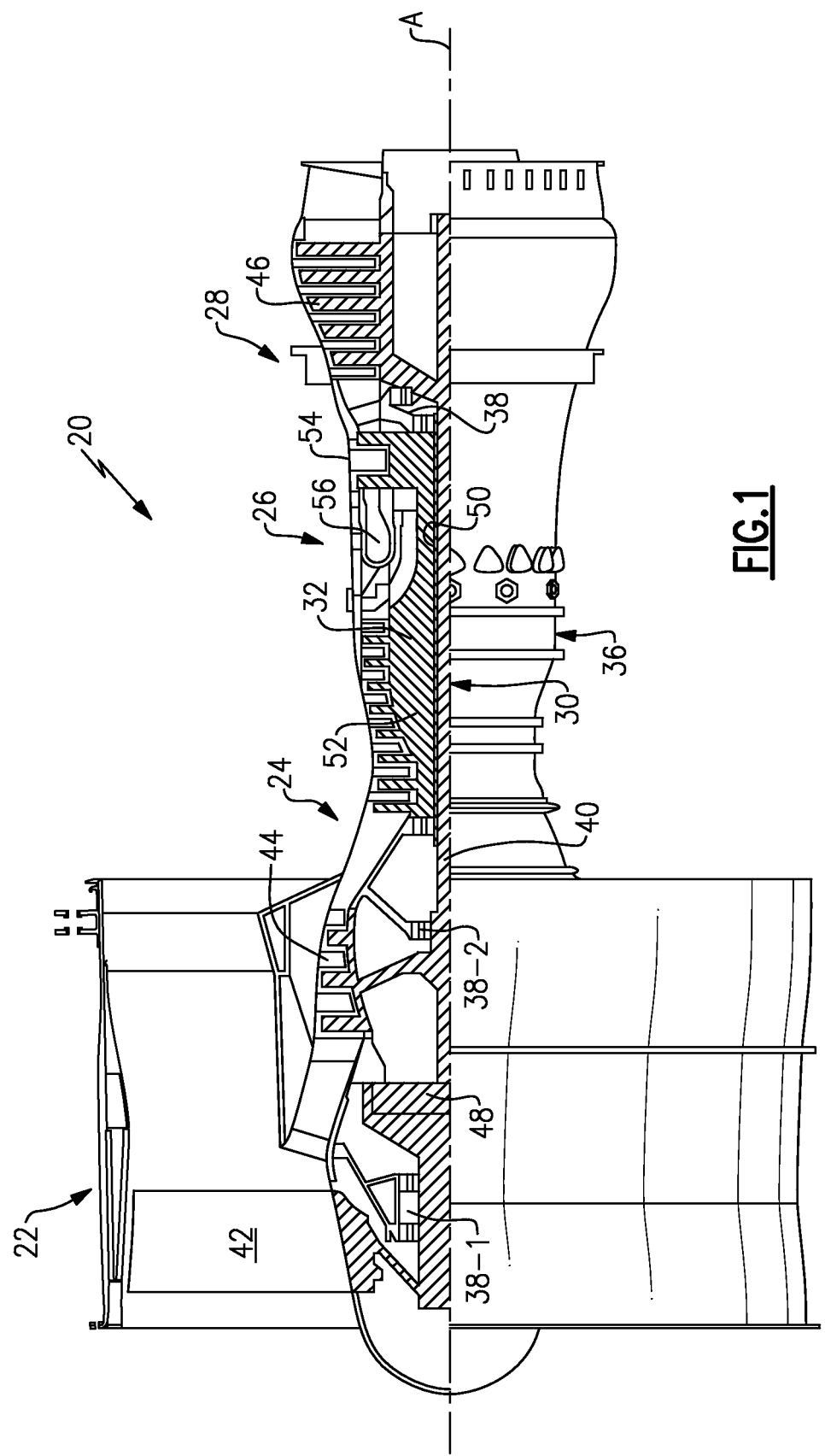
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The engine shafts 40, 50 are supported at a plurality of points by bearing structures 38 within the engine static structure 36. In one non-limiting embodiment, bearing structures 38 includes a #1 bearing structure 38-1 forward of the gearbox 72 and a #2 bearing structure 38-2 located aft of the gearbox 72.

Figure 2:
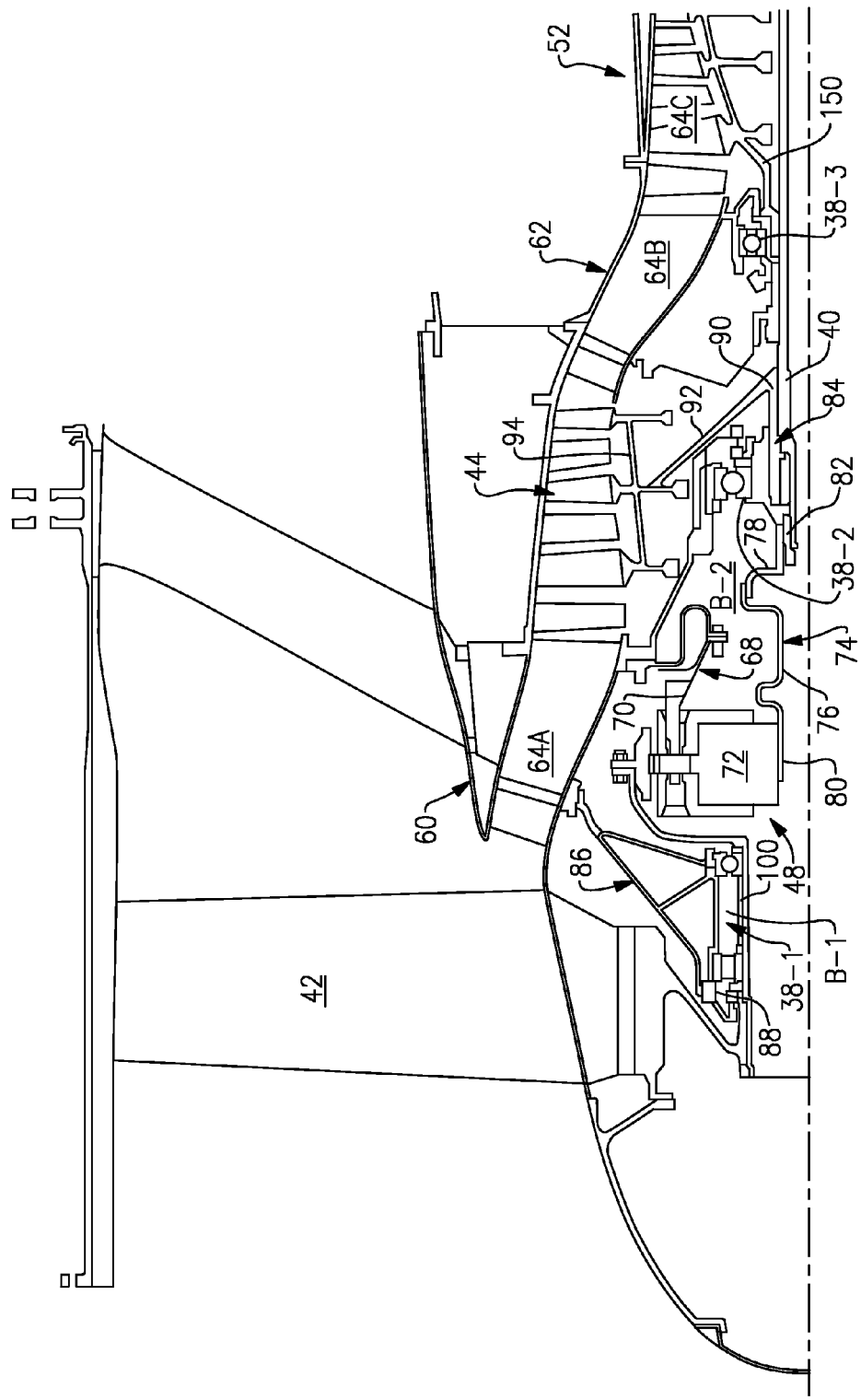
FIG. 2 is an enlarged schematic cross-section of a sectional of the gas turbine engine.

With reference to FIG. 2, the engine static structure 36 proximate the compressor section 24 generally includes a front center body case structure 60 and an intermediate case structure 62 which mounts aft of the front center body case structure 60. It should be appreciated that various case structures may alternatively or additionally be provided, yet benefit from the architecture described herein.

The front center body case structure 60 generally defines an annular core flow path 64A for the core airflow into the low pressure compressor 44. The intermediate case structure 62 defines the core flow path 64B aft of the core flow path 64A into the high pressure compressor 52 core flow path 64C. The core flow path 64B is generally radially inward of the core flow path 64A to transition into the radially smaller diameter core flow path 64C. That is, the core flow path 64B generally defines a "wasp waist" gas turbine engine architecture.

The #2 bearing structure 38-2 at least partially supports the inner shaft 40 relative to the front center body case structure 60. A #3 bearing structure 38-3 generally supports the outer shaft 50 relative the intermediate case structure 62. That is, the #2 bearing structure 38-2 at least partially supports the low spool 30 and the #3 bearing structure 38-3 at least partially supports the high spool 32. It should be appreciated that various bearing systems such as thrust bearing structures and mount arrangements will benefit herefrom.

A flex support 68 provides a flexible attachment of the geared architecture 48 within the front center body case structure 60. The flex support 68 reacts the torsional loads from the geared architecture 48 and facilitates vibration absorption as well as other support functions. A centering spring 70, which is a generally cylindrical cage-like structural component with a multiple of beams that extend between flange end structures, resiliently positions the #2 bearing structure 38-2 with respect to the low spool 30. In one embodiment, the beams are double-tapered beams arrayed circumferentially to control a radial spring rate that may be selected based on a plurality of considerations including, but not limited to, bearing loading, bearing life, rotor dynamics, and rotor deflection considerations.

The gearbox 72 of the geared architecture 48 is driven by the low spool 30 in the disclosed non-limiting embodiment through a coupling shaft 74. The coupling shaft 74 transfers torque through the #2 bearing structure 38-2 to the gearbox 72 as well as facilitates the segregation of vibrations and other transients. The coupling shaft 74 in the disclosed non-limiting embodiment includes a forward coupling shaft section 76 and an aft coupling shaft section 78. The forward coupling shaft section 76 includes an interface spline 80 which mates with the gearbox 72. An interface spline 82 of the aft coupling shaft section 78 connects the coupling shaft 74 to the low spool 30 through, in this non limiting embodiment, a low pressure compressor hub 84 of the low pressure compressor 44.

A fan rotor bearing support structure 86 aft of the fan 42 extends radially inward from the front center body case structure 60. The fan rotor bearing support structure 86 and the front center body case structure 60 defines a bearing compartment B-2. It should be appreciated that various bearing structures 38 and seals 88 may be supported by the fan rotor bearing support structure 86 to contain oil and support rotation of an output shaft 100 which connects with the geared architecture 48 to drive the fan 42.

The low pressure compressor hub 84 of the low pressure compressor 44 includes a tubular hub 90 and a frustro-conical web 92. The tubular hub 90 mounts to the inner shaft 40 through, for example, a splined interface adjacent to the #2 bearing structure 38-2. The frustro-conical web 92 extends in a forwardly direction from the tubular hub 90 axially between the #2 bearing structure 38-2 and the #3 bearing structure 38-3. That is, the frustro-conical web 92 is axially located between the bearing structures 38-2, 38-3.

Figure 3:
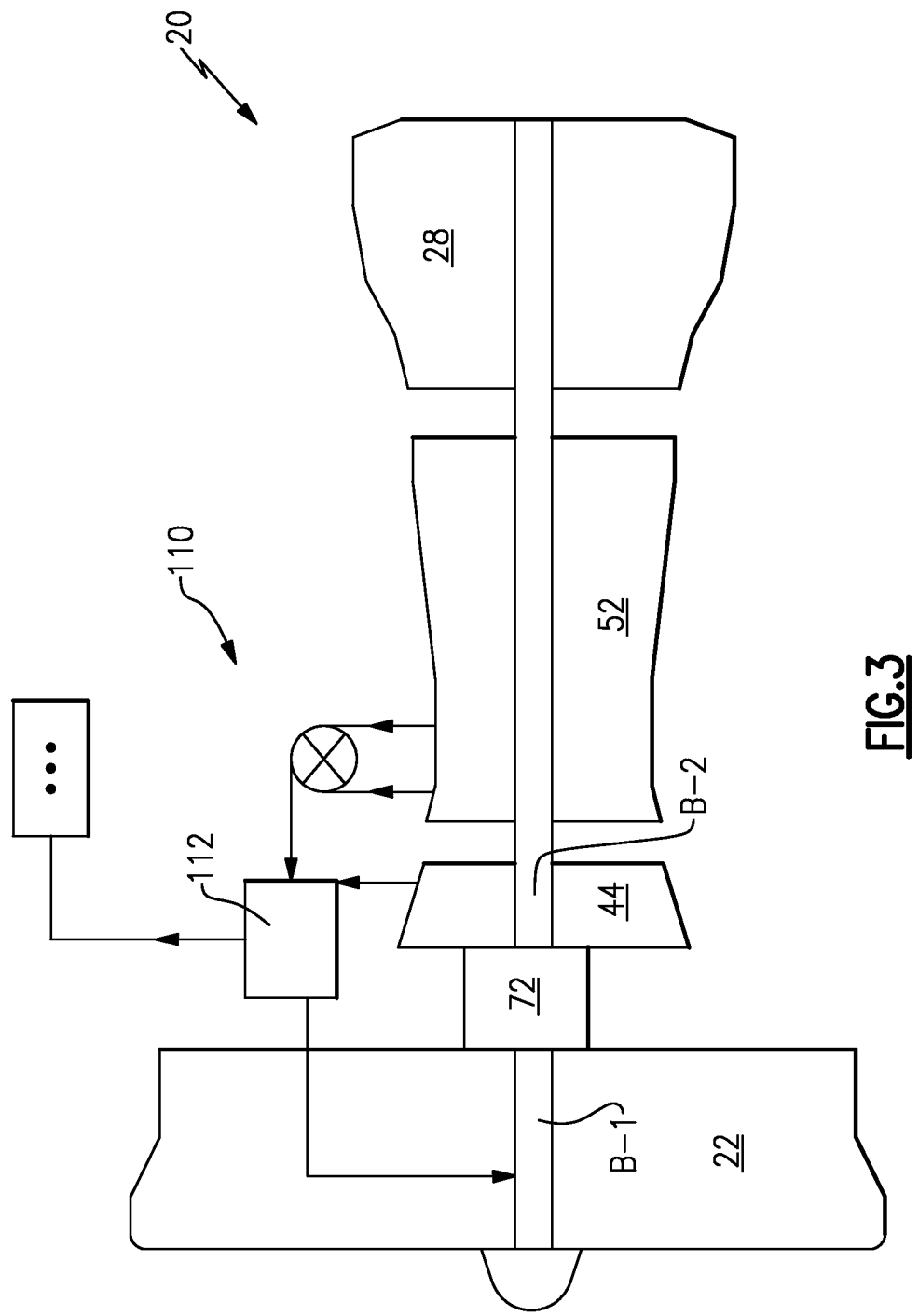
FIG. 3 is a schematic view of a gas turbine engine with a bearing compartment passage structure which bypasses around a geared architecture.

The #1 bearing structure 38-1 supports the output shaft 100 which connects the geared architecture 48 to the fan 42. The #1 bearing structure 38-1 is located within a bearing compartment B-1 that is isolated by the geared architecture 48 from bearing compartment B-2. That is, the #1 bearing compartment B-1 is isolated from the engine core aft of the geared architecture 48 and receives its buffer pressurization supply of buffer supply air through a #1 bearing compartment passage structure 110 that crosses the annular core flow path 64A for the core airflow into the low pressure compressor 44 (FIG. 3).

Figure 4:
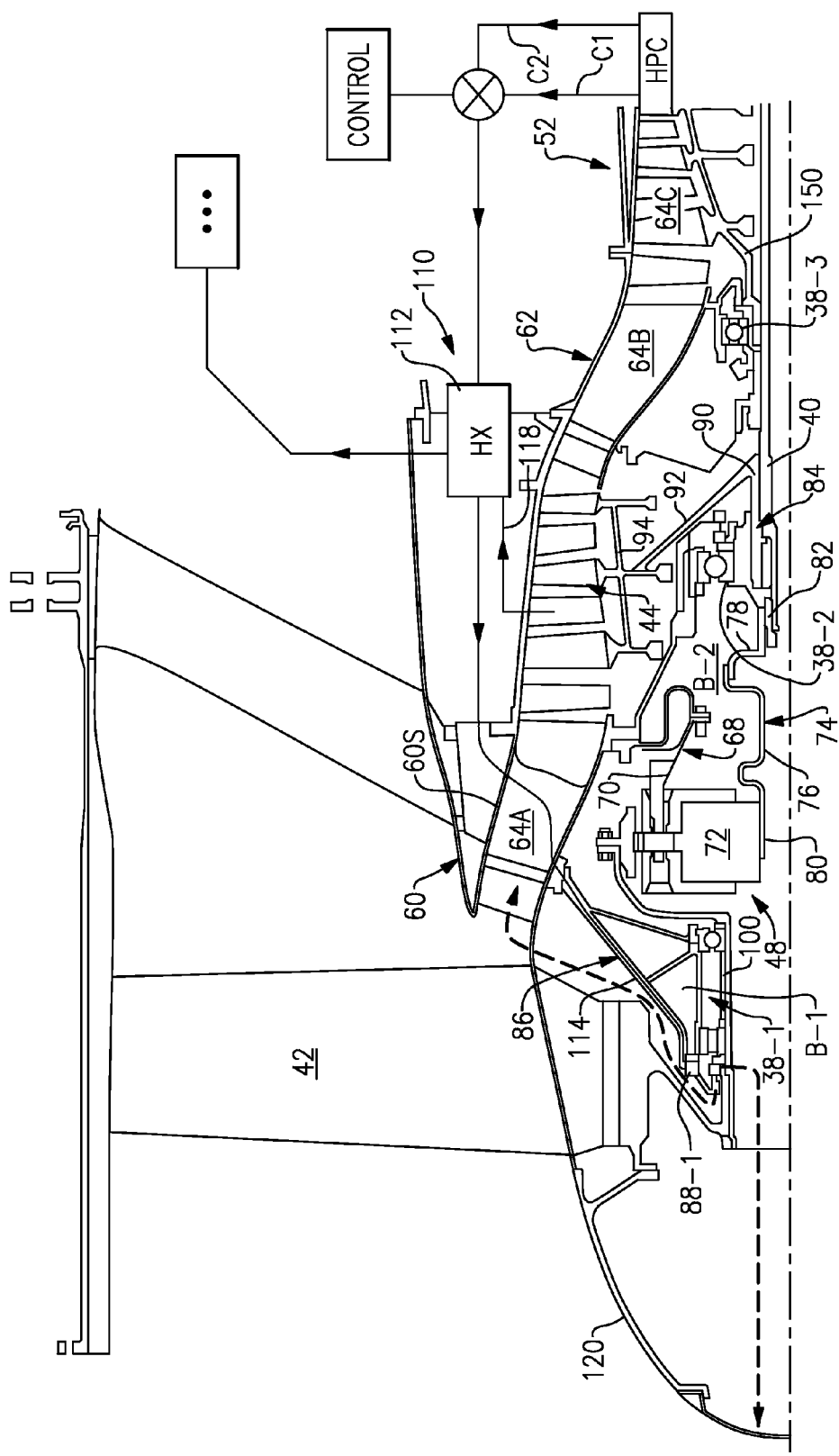
FIG. 4 is an enlarged schematic cross-section of a sectional of the gas turbine engine, which illustrates the bearing compartment passage structure.

With reference to FIG. 4, the #1 bearing compartment passage structure 110 is in communication with the core engine such as with the high pressure compressor 52 to supply a higher pressure bleed air flow of buffer supply air into the #1 bearing compartment B-1 such as the seal 88-1 to, for example, pressurize the seal 88-1 and seal lubricating fluid with respect to the #1 bearing structure 38-1. The buffer supply air may be communicated from various other sources and may pass through, for example, a conditioning device 112 such as a buffer heat exchanger. The conditioning device 112 may further condition bleed flow C1, C2 from the high pressure compressor It should be appreciated the various bleed sources from the high pressure compressor 52 may be selected through a valve 116.

The #1 bearing compartment passage structure 110 may be at least partially defined by a hollow front center body strut 60S of the front center body case structure 60 to permit the buffer supply air to cross the annular core flow path 64A without flow interference. That is, the buffer supply air is communicated through the hollow front center body strut 60S and the core airflow passes around the hollow front center body strut 60S.

From the hollow front center body strut 60S, the buffer supply air is communicated through a passage 114 in the fan rotor bearing support structure 86 to, for example, the seal 88-1. It should be appreciated that various passages may alternatively or additionally be provided.

The passage of buffer supply air through the fan rotor bearing support structure 86 advantageously promotes heat transfer between the buffer supply air and the #1 bearing compartment B-1 to reduce buffer supply air maximum temperate at high power condition and increases buffer supply air minimum temperatures at lower power settings. As the #1 bearing structure 38-1 operates at a generally constant temperature, the #1 bearing compartment B-1 operates as a thermal ground with respect to the buffer supply air.

Downstream of the #1 bearing compartment B-1, the buffer supply air may be communicated in various manners for various usages such as toward the spinner 120 to facilitate spinner die-icing. The buffer supply air may alternatively or additionally be ejected outward aft of the fan 42 to recirculate into the annular core flow path 64A to minimize any effect upon engine efficiency.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A gas turbine engine comprising:
a front center body case structure;
a geared architecture at least partially supported by said front center body case structure;
a bearing structure mounted to said front center body case structure to rotationally support a shaft driven by said geared architecture; and
a bearing compartment passage structure in communication with said bearing structure through said front center body case structure.

2. The gas turbine engine as recited in claim 1, wherein said bearing structure includes a seal.

3. The gas turbine engine as recited in claim 1, wherein said bearing structure includes a bearing.

4. The gas turbine engine as recited in claim 1, wherein said bearing compartment passage structure includes a hollow front center body strut.

5. The gas turbine engine as recited in claim 4, wherein said hollow front center body strut is in fluid communication with a fan rotor bearing support structure which at least partially supports said bearing structure.

6. The gas turbine engine as recited in claim 1, further comprising a conditioning device in communication with said bearing compartment passage structure.

7. The gas turbine engine as recited in claim 6, wherein said conditioning device is a heat exchanger.

8. The gas turbine engine as recited in claim 6, wherein said conditioning device is in communication with a high pressure compressor.

9. The gas turbine engine as recited in claim 8, wherein said high pressure compressor is axially downstream of said geared architecture.

10. The gas turbine engine as recited in claim 6, wherein said conditioning device is radially outboard of a low pressure compressor.

11. The gas turbine engine as recited in claim 10, wherein said low pressure compressor is downstream of said geared architecture.

12. The gas turbine engine as recited in claim 1, wherein said shaft drives a fan through said geared architecture.

13. The gas turbine engine as recited in claim 12, wherein said bearing structure is axially between said fan and said geared architecture.

14. The gas turbine engine as recited in claim 13, wherein said front center body case structure defines a core flow path for a core airflow.

15. A method of communicating a buffer supply air for a gas turbine engine comprising:
communicating a buffer supply air across an annular core flow path; and
communicating the buffer supply air through a hollow front center body strut of a front center body case structure which defines the annular core flow path, the hollow front center body strut within the annular core flow path.

16. The method as recited in claim 15, further comprising:
communicating the buffer supply air to a bearing compartment forward of a geared architecture.

17. The method as recited in claim 15, further comprising:
communicating the buffer supply air through a conditioning device upstream of the hollow front center body strut.

18. The method as recited in claim 15, further comprising:
communicating the buffer supply air to a bearing structure mounted to a front center body case structure which defines the annular core flow path, the bearing structure rotationally supporting a shaft driven by a geared architecture.

19. The method as recited in claim 18, further comprising:
driving a fan through the geared architecture, the bearing structure axially located between the fan and the geared architecture.

20. A method of communicating a buffer supply air for a as turbine engine comprising:
communicating a buffer supply air across an annular core flow path;
communicating the buffer supply air to a bearing structure mounted to a front center body case structure which defines the annular core flow path, the bearing structure rotationally supporting a shaft driven by a geared architecture;
driving a fan through the geared architecture, the bearing structure axially located between the fan and the geared architecture; and
communicating the buffer supply air to a spinner supported by the fan.

* * * * *